United States Patent [19]

Hurst

[11] Patent Number: 5,026,986
[45] Date of Patent: Jun. 25, 1991

[54] RADON MONITOR AND CONTROL SYSTEM BASED UPON ALPHA PARTICLE DETECTION

[75] Inventor: George S. Hurst, Oak Ridge, Tenn.
[73] Assignee: Consultec Scientific, Inc., Knoxville, Tenn.
[21] Appl. No.: 364,209
[22] Filed: Jun. 9, 1989
[51] Int. Cl.$^5$ .............................................. G01T 1/00
[52] U.S. Cl. .................................. 250/255; 250/253; 250/370.02
[58] Field of Search .................... 250/253, 255, 370.02, 250/374, 375, 379, 380

[56] References Cited

U.S. PATENT DOCUMENTS 3,922,555 11/1975 Chapuis et al. .................. 250/472.1
4,871,914 10/1989 Simon et al. .................... 250/370.02

FOREIGN PATENT DOCUMENTS 0099630 6/1983 Japan ................................ 98/42.04
64-88285 4/1989 Japan ............................... 250/393
141553 10/1960 U.S.S.R. ............................ 250/364

Primary Examiner—Constantine HAannaher
Assistant Examiner—Edward J. Glick
Attorney, Agent, or Firm—Pitts and Brittian

[57] ABSTRACT

A system for monitoring or controlling the level of radon in indoor air, based upon measuring alpha particles due to the decay of radon or its daughter atoms. In one embodiment, the alpha particle decay of radon itself is detected and analyzed to control a vent in the heating and air conditioning system to automatically keep the radon level below a preselected level. In another embodiment, the daughter atoms $^{218}$Po and $^{214}$Po are collected from the indoor air and their alpha particle decays are analyzed to provide a sensitive monitor of radon levels or to control vents in the HVAC system to reduce radon concentrations to permissible levels. In addition, the system provides information on the quality of the air filter and indicates when it needs servicing.

11 Claims, 5 Drawing Sheets

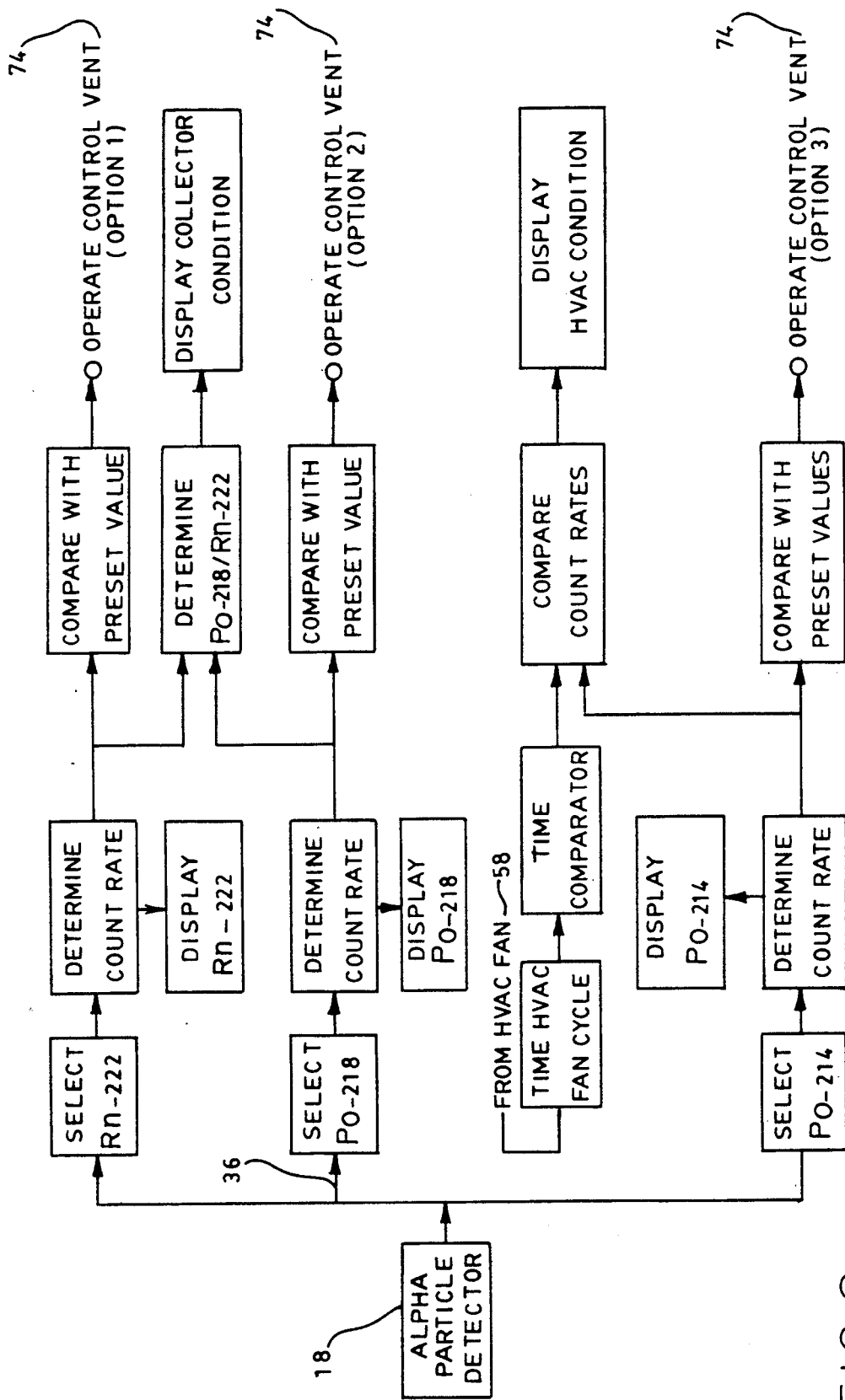

RADON MONITOR AND CONTROL SYSTEM BASED UPON ALPHA PARTICLE DETECTION

DESCRIPTION

1. Technical Field

This invention relates to a radon monitor and control system which analyzes the parent atom and two daughter atoms, $^{218}$Po and $^{214}$Po, to determine if the radon level in an enclosed environment has exceeded a preselected threshold level, to activate a vent to reduce radon levels, and to monitor the quality of the air filter in a conventional heating, ventilating and air conditioning (HVAC) system.

2. Background Art

Modern energy conservation practices in residential and commercial environments have created a high level of radon gas to which building occupants are exposed. There are widely held beliefs that the levels of radon are such that the radioactive daughter atoms [polonium-218 ($^{216}$Po) and polonium-214 ($^{214}$Po)] are producing lung and other cancers Some studies claim that residents in homes having elevated radon levels will be subjected to an increase in the incidence of lung cancer.

It has long been known that radon gas can escape from building materials or the environs of buildings to create health risks to the occupants. As early as 1955, it was pointed out by Gabrysh and Davis (*Nucleonics,* January, 1955, p. 50) that Chattanooga black shale is relatively rich in radium and that in that region of the country radon found its way into residential and commercial buildings. In recent years, the problem of radon in indoor air has become severe due to the practice of energy conservation in modern homes. Further, high levels of radon can be found in homes located throughout the United States, as shown on a map by Fortmann (*ASTM Standardization News,* December, 1988, pp. 50–53). The magnitude of radon levels found in these homes was analyzed b statistical sampling methods and presented in an article by Nero, et al. [Nero. Schgwehr, Nazaroff, and Revzan, *Science* 234, 992–997 (1986)]. These authors report that the average level of radon-222 ($^{222}$Rn) is 1.5 pCi/L of indoor air and that the lifetime risk of lung cancer corresponding to this level of exposure is about 0.3 percent. Between one percent and three percent of the U.S. homes have a radon level exceeding 8 pCi/L. The Environmental Protection Agency recommends that the radon level not exceed 4 pCi/L. The radon problem has been reviewed recently in such widely read journals as *Physic Today* (Anthony Nero, April, 1989, p. 32) and *National Geographic* (April, 1989, p. 403).

When radon gas is present in a building, a series of complex processes is involved in placing the occupants at risk. It is believed that the most serious threat to human health is that of lung cancer due to the depositing of alpha-emitting daughter atoms of radon. These are $^{218}$Po emitting 6.0-MeV alphas with a half-life of three minutes and $^{214}$Po emitting 7.7-MeV alphas with a half-life of 150 microseconds. In this radium decay chain there are intervening beta decay processes of somewhat longer half-lives so that the effective half-life in going from $^{218}$Po to $^{210}$Pb is about 40 minutes. The product lead-210 ($^{210}$Pb) is a beta emitter with a half-life of 22 years in decaying to bismuth-210 ($^{210}$Bi) which terminates the chain. In a static room, the time required for the daughter atoms to diffuse to the walls would be much longer than the decay time of 40 minutes. If the daughter atom is attached to atmospheric gases or dust particles, this diffusion time is even longer. However, if the heating and air conditioning system is operating, the circulation time of air through the system is typically about 20 minutes; thus, the daughter atoms would be partially filtered. Such filtering, however, removes little of the radon gas ($^{222}$Rn) with a half-life of 3.8 days; thus, the daughter atom $^{218}$Po, which has a half-life of only three minutes, comes quickly back into equilibrium with the radon. While the home filtering system could have some value in reducing the level of $^{214}$Po, it will be of little value for filtering the $^{218}$Po.

There are a number of factors which can determine the level of radon in a building. The rate of diffusion of radon into a building depends on the building location, type of soil, weather and seasonal variations, the design of the building, and its maintenance. For instance, small cracks developing in a basement wall as the building ages could drastically change the rate of radon accumulation. Worse, even at a constant rate of entry, there are a number of housekeeping factors such as the amount of ventilation, the number of times the doors are opened, and the type of heating system and its schedule of use which can alter the level of radon. When these factors which control the level of radon itself are considered with other factors, such as room humidity and dust, which control the fate of the daughter atoms produced by the radon, it can be seen that the health risk cannot reliably be tracked by an occasional canister sample sent to a laboratory.

Accordingly, it is an object of the present invention to provide a simple, accurate, and low-cost device for monitoring and/or controlling the level of radon in homes and commercial establishments.

Moreover, it is an object of the present invention to provide such a radon detector and/or control system that keeps the average radon level below a guideline or preselected threshold level in a manner which is consistent with reasonable energy conservation practices.

The device of the present invention is based upon the detection and/or control of radon by monitoring $^{222}$Rn or radon products—namely, $^{214}$Po and $^{218}$Po, which are commonly referred to as daughter atoms. By monitoring the detection rate or count of these three atoms in separate channels in the preferred embodiment, data can be gathered concerning the need for HVAC filter replacement and/or steps to be taken to accomplish venting the air within the enclosed environment to the outside, thereby reducing the health hazard due to the daughter atoms of radon.

DISCLOSURE OF THE INVENTION

Other objects and advantages will be accomplished by the present invention which provides a radon monitor and control system for detecting and controlling the level of radon and its products, or daughter atoms, in an enclosed environment such as a home or commercial building. The level of each of these three types of atoms ($^{222}$Rn, $^{218}$Po, and $^{214}$Po) can be determined with detectors such as pulse ionization chambers or solid state particle detectors. One such satisfactory alpha particle detector is the DIAD II, manufactured by EG&G OR-TEC, 100 Midland Road, Oak Ridge, Tenn. 37830. Further, these devices can be used to identify separately each type of atom since the alpha particle energies differ and are, respectively, 5.5 MeV, 6.0 MeV, and 7.7 MeV. In this mode of operation, the detectors are usually referred to as alpha-particle spectrometers. Several embodiments of the invention are based on the separate use of the data obtainable with the alpha spectrometer. In one embodiment, the data obtained on the level of the radioactive gas itself is used to activate a vent in the HVAC system to control the level of radon in the building. In another embodiment, the level of $^{218}$Po is determined by collecting daughter atoms from the room onto a collector for a more sensitive monitor of the radon level and to provide indication of these levels. In still another, and preferred embodiment, the levels of $^{218}$Po and $^{214}$Po are determined and are used to control the HVAC system. One such control feature is the reduction of the radon level by activating a vent based on the information on the $^{218}$Po level. Another significant control feature is the monitoring of the efficacy of the HVAC filter for removing dust particles from the air, based on the level of $^{214}$Po as affected by the HVAC fan. In this filter testing mode, the fan should be left on for 30 to 45 minutes as will become more evident in the illustrations below.

Still another use of information derived from the alpha-particle spectrometer is that of testing the performance of the collector for the polonium atoms by monitoring the ratio $^{218}$Po/$^{222}$Rn in the detector port. In summary, the invention utilizes an alpha-particle spectrometer that can distinguish the species $^{222}$Rn, $^{218}$Po, and $^{214}$Po, and information on all three types of atoms is used to monitor and improve indoor air quality.

BRIEF DESCRIPTION OF THE DRAWINGS

FIG. 8 is a flow chart of the system operation.

BEST MODE FOR CARRYING OUT THE INVENTION

Figure 7:
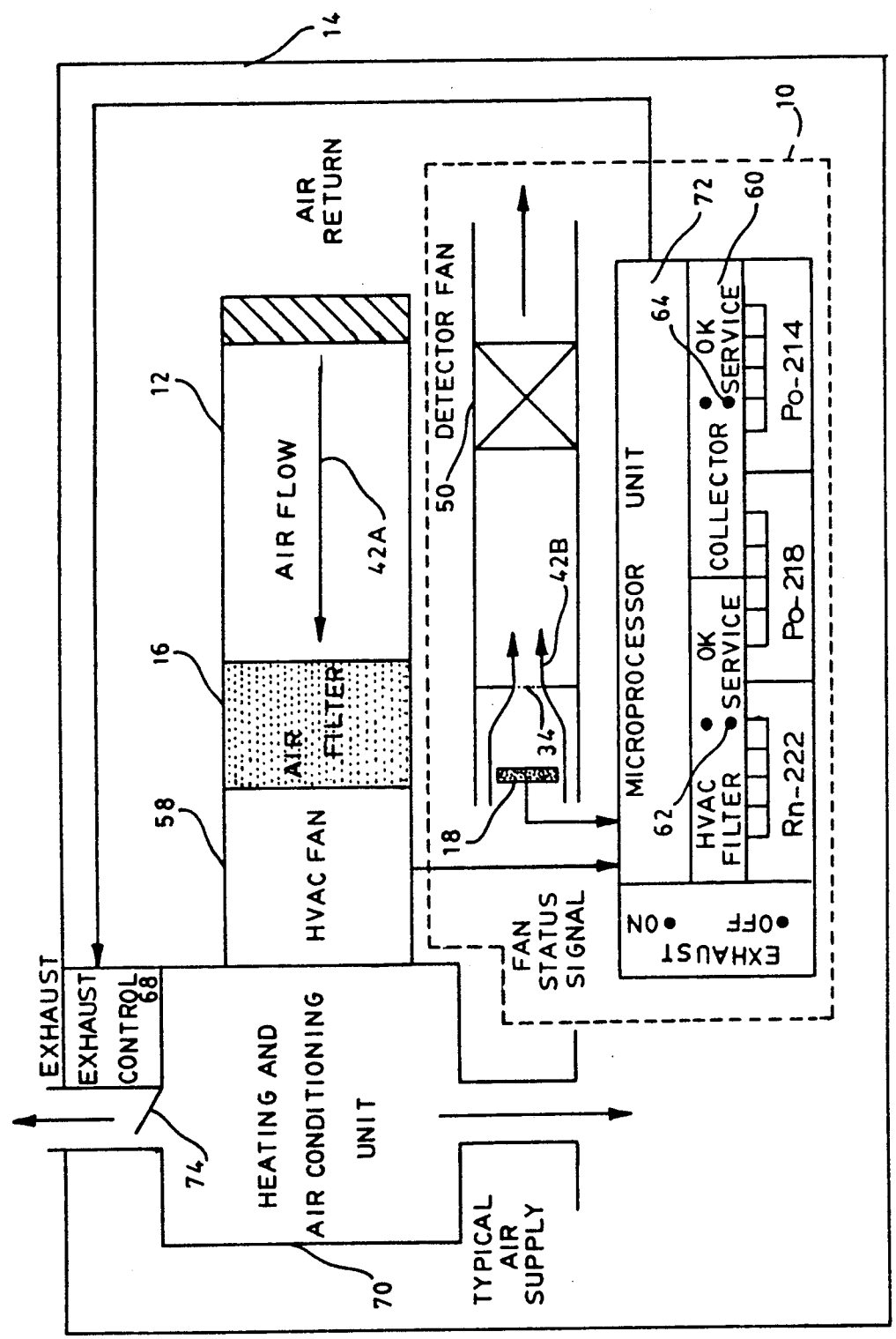
FIG. 7 is one illustration of how the entire data stream is used to monitor radon, to reduce radon levels, to monitor the HVAC filter, and to self-check the detector in an integrated HVAC system.

Referring first to FIG. 7, a radon monitor and control unit, generally indicated at 10, is constructed in accordance with various features of the present invention and provides a number of embodiments to accomplish several objectives. The invention 10 can be configured to be a stand-alone unit to monitor the ambient radon level in a building 14. In the preferred embodiment, the invention can be configured into the HVAC system 12 of a building 14 to control or reduce radon levels therein. The invention 10 also provides means for monitoring the efficacy of the HVAC filter 16, and for self-checking the radon detector 18. When used as a part of an overall control system as illustrated in FIG. 7, the monitor 10 will regulate the ventilation system of a conventional HVAC system 12 to maintain the radon level below a preselected threshold.

Figure 1:
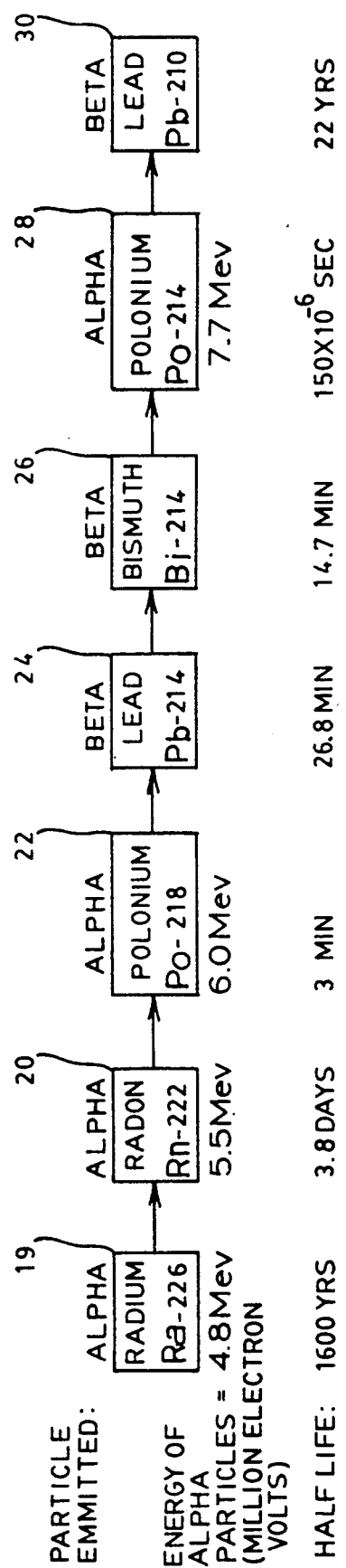
FIG. 1 shows a decay scheme of $^{222}$Ra, the type of particles emitted, their energies, and the half-lives of daughter products in the decay to $^{210}$Pb.

A portion of a radium 19 decay scheme from radium-226, shown at block 19 is shown in FIG. 1 to illustrate how $^{222}$Rn at block 20 is generated in the environs of most buildings in the United States and elsewhere. This radioactive gas can enter these buildings through transport and diffusion processes to place the occupants at risk of an increased lung cancer arising primarily from the inhalation of the daughter products $^{218}$Po (at block 22) and $^{214}$Po (at block 28). Shown in FIG. 1 are the decay processes in which radon $^{222}$Rn (at block 20) is transformed into lead $^{210}$Pb (at block 30). In these steps, there are three alpha-particle emitters, $^{222}$Rn (at block 20) which emits a 5.5-MeV alpha particle with a half-life of 3.8 days, $^{218}$Po (at block 22) which emits an alpha particle of 6.0 MeV with a half-life of three minutes, and $^{214}$Po (at block 28) which emits an alpha particle of 7.7 MeV with a half-life of 150 microseconds. As has already been described, there are intervening beta decay processes of somewhat longer half-lives so that the effective half-life in going from $^{218}$Po (block 22) to $^{210}$Pb (block 30) is about 40 minutes. The product lead-210 ($^{210}$Pb) (block 30) is a beta emitter with a half-life of 22 years in decaying to bismuth 210 ($^{210}$Bi) (not shown) which terminates the chain.

Figure 2:
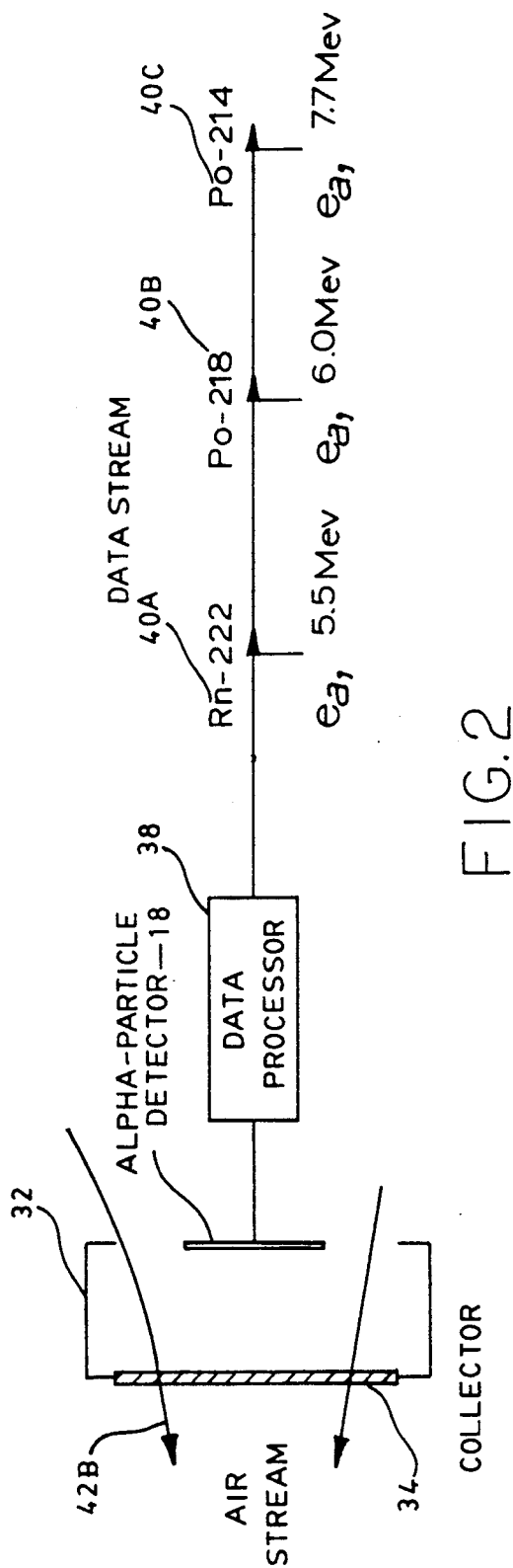
FIG. 2 depicts the alpha-particle spectrometer and the data stream generated by detecting $^{222}$Rn, $^{218}$Po, and $^{214}$Po.

The detection and resolution of these individual alpha particles is an essential feature of the present invention and is shown diagrammatically in FIG. 2.

There are several known means for detecting alpha particles and some of these, such as pulse ionization chambers and surface barrier detectors, provide information on the energy of individual alpha particle interactions. FIG. 2 illustrates the use of a surface barrier detector at 18; however, this could be some other solid state device, provided that it is a device in which the amplitude of the electrical pulses generated is uniquely related to the energy of the alpha particle striking the detector. Because these devices can resolve the energy of a particle, we will refer to them as alpha-particle spectrometers. In FIG. 2, a typical alpha-particle spectrometer 18 is shown mounted inside an enclosure 32 which is open to the atmosphere for admission of radon gas. An alpha particle from the decay of $^{222}$Rn can be resolved as belonging to the 5.5-MeV group since the dimensions of the enclosure 32 and the air pressure therein, normally one atmosphere of pressure, are such that only a small fraction of the particle's energy is lost before striking the alpha-particle spectrometer 18. Thus, one may assign the impulses having amplitudes corresponding to about 5.5 MeV to the decay of a $^{222}$Rn atom. Now it happens that the level of concern presently recommended by the Environmental Protection Agency, EPA, is about 4 pCi of radon per liter of indoor air. In an enclosure volume of about 10 cubic centimeters, such as that illustrated in FIG. 2, the disintegration rate is only about 4 alpha particles per hour due to the decay of $^{222}$Rn. Further, the disintegration rate and hence the rate of alpha-particle emission due to the daughter atoms $^{218}$Po and $^{214}$Po is, at equilibrium, of like magnitude. Thus, the data stream, 36, as an output of the data processor 38, illustrated as a part of FIG. 2, will consist of resolved energy peaks 40 which can be associated with the infrequent decay of $^{222}$Rn (at 40A), $^{218}$Po (at 40B), and $^{214}$Po (at 40C), respectively. Note, however, that in FIGS. 2 and 7, the enclosure 32 contains a filter 34 which serves to collect the daughter atoms since these are usually in the form of small dust particles in the indoor air. Forced flow of air 42B through the detector assembly 32 will cause a large increase in the $^{218}$Po (at 40B) and the $^{214}$Po (at 40C) count as shown in FIGS. 2 and 3, but will not materially increase the count rate due to $^{222}$Rn (at 40A).

Figure 3:
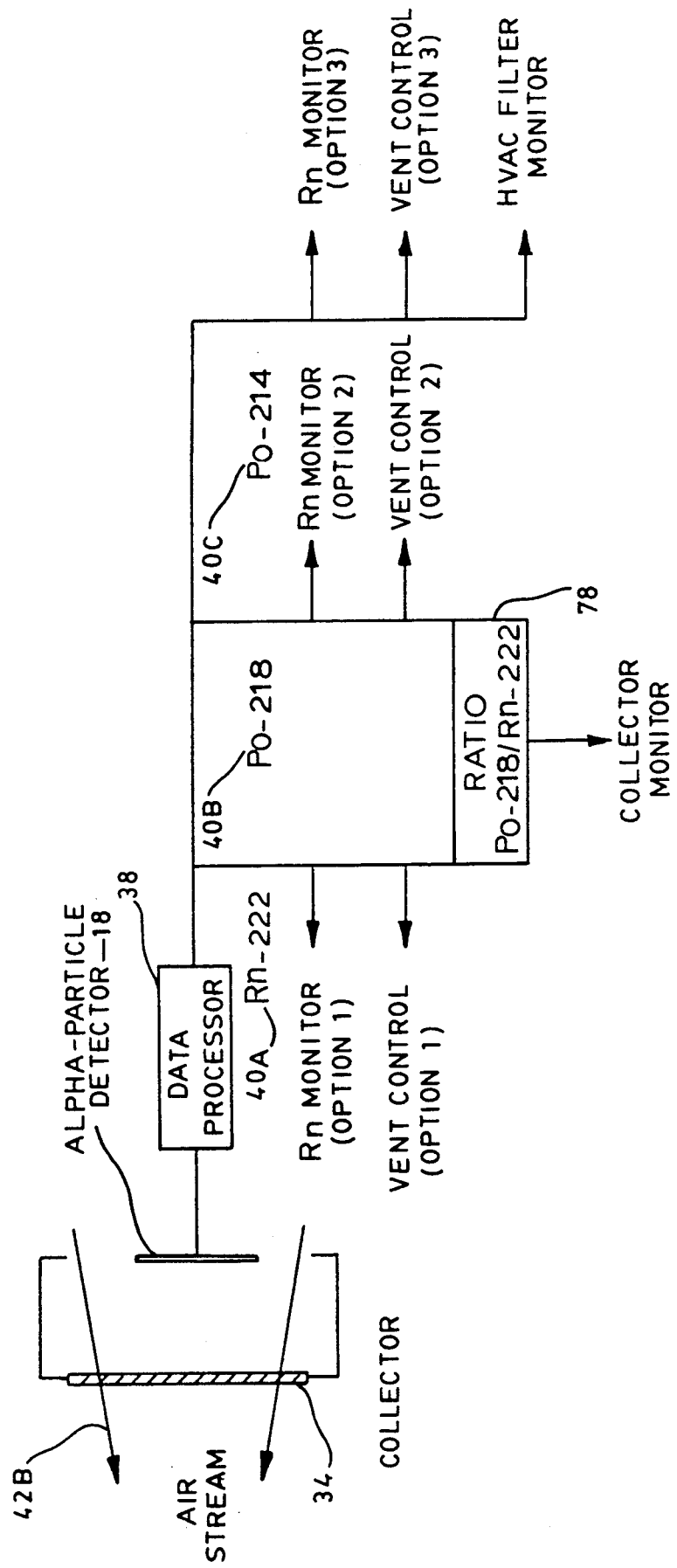
FIG. 3 illustrates the use of the data stream to monitor the level of indoor radon, to reduce the radon level, to monitor the efficacy of the HVAC air filter, and to self-check the collector of the daughter atoms. Several options are shown for monitoring and venting radon.

The various options for the beneficial use of the information from the alpha-particle spectrometer 18 is illustrated by means of FIG. 3. For a stand-alone unit to monitor the radon level, there are three options: Option 1, direct detection of $^{222}$Rn; Option 2, the detection of $^{218}$Po; or, Option 3, the detection of $^{214}$Po. The use of the daughter atoms will be recognized as indirect methods for detecting radon but they are quite reliable and can be used for more sensitive detection of radon by forcing air at 42B through the detector enclosure 32. As shown in FIG. 7, each of the monitoring options just described for detecting indoor radon can be used to activate the exhaust vent 74 in the HVAC unit 12 to control the radon level, thereby keeping its average level below that of concern. Of these, Option 2, based on detection of $^{218}$Po, is preferred because it provides a much faster response to changing radon levels. The use of $^{214}$Po is very well suited to monitoring the efficacy of the air filter 16 in the HVAC system 12. Finally, the ratio $^{218}$Po/$^{222}$Rn 78 is used to monitor the air flow through the daughter atom filter or collector 34, serving as a self-check of this vital feature of the spectrometer.

Several methods of data acquisition and processing are available to achieve the objectives of this invention. Analog methods are not as desirable, especially for the analysis of the low count rate of the $^{222}$Rn data, as digital methods are readily available in microprocessors. For illustration of further features of this invention, the use of microprocessors 72 will be understood, but it is not the intention to limit the invention to their use. The use of the data stream 36 as illustrated in FIGS. 2 and 3 can be further clarified by referring to additional illustrations in FIGS. 4, 5, and 6.

Figure 4:
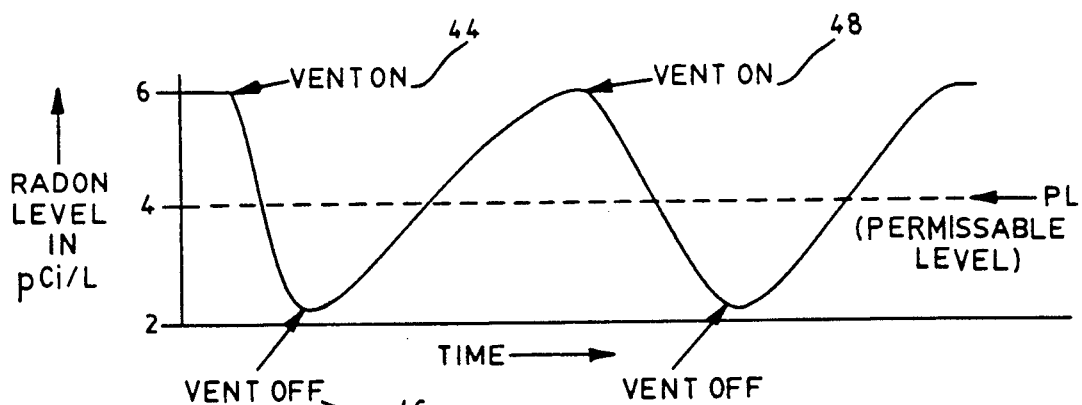
FIG. 4 illustrates the logic involved in maintaining the average radon level below the permissible level.

Thus, the manner in which the sensors are used to keep the radon concentration below an acceptable or permissible level is shown in FIG. 4. In the example shown, vent 74 is turned on (opened) when the radon level approaches 6 pCi/L (at 44); and after a short time, when venting has decreased the radon level to about 2 pCi/L, the vent is closed (at 46) for energy conservation purposes, until after the passage of a much longer time, when the radon level again approaches the trip level (at 48). Conversion of count rate to picocuries per liter is achieved through a calibration process which is well known to those skilled in the art of radiation physics.

Figure 5:
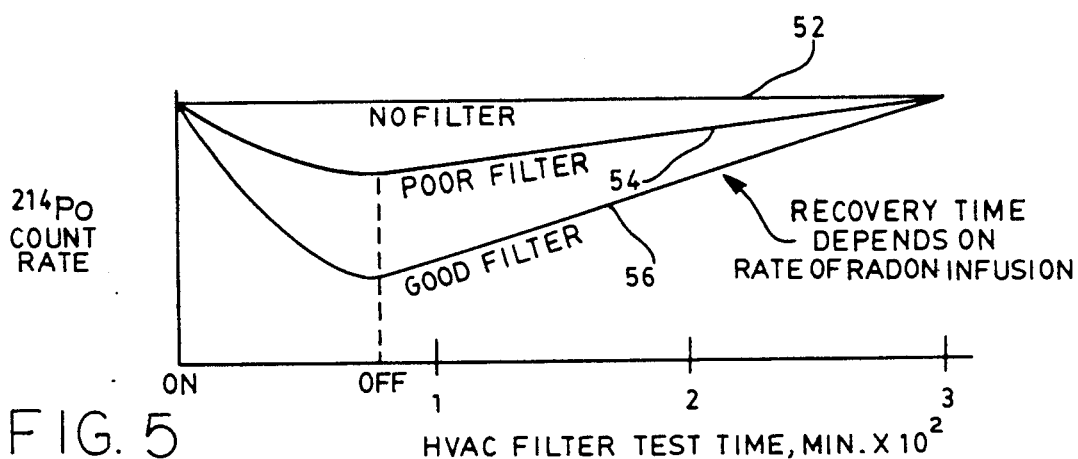
FIG. 5 shows how the $^{214}$Po data is used to monitor the efficacy of the HVAC fan.

Likewise, FIG. 5 illustrates how the HVAC air filter 16 is monitored using the $^{214}$Po data. If the monitor assembly 10 is operated with its auxiliary fan 50 operating constantly, then the response of the monitor 10 to the main air fan 58 (see FIG. 7) will be as shown in FIG. 5 for three filter conditions—namely no filter (at 52) poor filter (at 54), and good filter (at 56). It should be noted that the typical exchange time for air in a residence is about 20 minutes. For this reason, it will sometimes be desirable to program the fan 50 especially for the filter test, so that the fan 50 is kept on long enough for a valid test. This could be done routinely, for example once per week. When it is found that the monitor's output does not change sufficiently during this test period, an indicator 62 appears on the panel 60 of FIG. 7 to indicate that the main filter 16 needs attention. In the case of a disposable filter, replacement would be indicated; while in the case of an electrostatic type filter, service would be suggested.

Figure 6:
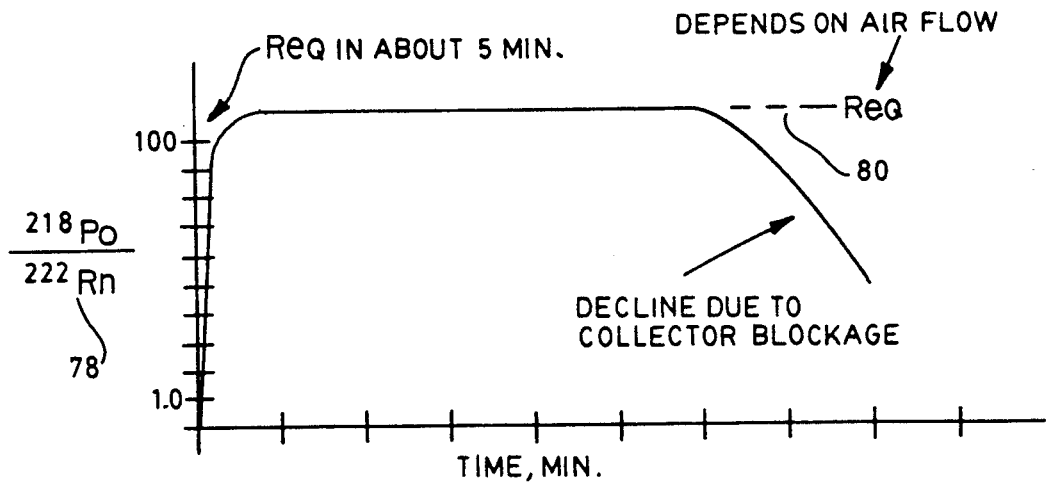
FIG. 6 illustrates the use of the ratio $^{218}$Po/$^{222}$Rn in self-checking the performance of the collector of daughter atoms.

Another use of the data stream is illustrated in FIG. 6 where the ratio $^{218}$Po/$^{222}$Rn (at 78) is plotted as a function of time. This ratio, determined automatically by the microprocessor, rises to a value substantially greater than one within a few minutes after the stream of air 42B starts through the detector assembly 32 (see FIG. 7), comes to an equilibrium value ReQ (at 80) in a few minutes because of the three minute half-life of $^{218}$Po, and remains constant thereafter unless the collector 32 of the daughter atoms becomes blocked by dust or other airborne material. Whenever the ratio 78 drops substantially below the nominal value, an indicator 64 is given on the panel 60 of FIG. 7 that the collector 34 (FIGS. 2 and 3) needs attention. Alternatively, the data could be used to automatically advance another collector 34 into the detector assembly 32 (FIGS. 2 and 3).

FIG. 8 diagrammatically illustrates the functions of the three system options in flow chart form. Option 1 illustrates the use of the radon gas atoms, $^{222}$Rn, to operate the exhaust/control vent 74. Option 2 uses the daughter atom polonium 218 and Option 3 uses daughter atom polonium 214 to accomplish the same end objective, i.e., open the exhaust/control vent 74 to vent contaminated air to the outside. All three options base their operation on the atom count obtained from the alpha particle detector 18 coupled through the data stream 36.

While a preferred embodiment of a radon monitor and control system based on the detection of $^{222}$Rn, $^{218}$Po, and $^{214}$Po atoms has been described and illustrated, it will be understood that there is no intent to limit the invention to such disclosure, but rather it is intended to cover all modifications and alternate constructions falling within the spirit and scope of the invention as defined in the appended claims and equivalents thereof.

I claim:

1. A radon monitor for use in a selected building environment to ascertain health hazard to persons within said building environment, comprising:
    a collector of radon decay products existing within said building environment;
    an electrical detector for producing electrical signals related to the number of alpha particles emitted by selected of said radon decay products on said collector according to selected energy ranges for each said selected radon decay products;
    means for acquiring and processing said electrical signals derived from said detector to convert alpha counts or count rates of each of said selected radon decay products to radon concentration within said building environment and for determining a relationship with a permissible threshold level; and
    means for displaying said radon concentrations and a condition that said threshold level has been exceeded.

2. The monitor of claim 1 wherein said collector is a filter for collecting particles containing said radon decay products, and said individual selected energy ranges are for the radon decay products selected from the group consisting of $^{222}$Rn, $^{218}$Po and $^{214}$Po.

3. A radon detector comprising:

a collector of solid particles containing radon and its daughter atoms;

an electrical detector for producing electrical signals related to the number of counts of alpha particles emitted from said radon and selected of its daughter atoms in selected energy ranges for each of said selected daughter atoms;

means for acquiring and processing said electrical signals to convert said alpha particle counts in said selected energy ranges to the number of daughter atoms of elements selected from the group consisting of $^{222}$Rn, $^{218}$Po and $^{214}$Po; and means for determining radon concentrations from said alpha particle counts of said selected daughter atoms.

4. The monitor of claim 3 wherein said collector is a filter for collecting particles containing said selected daughter atoms of $^{222}$Rn, $^{218}$Po and $^{214}$Po, wherein said detector is an alpha particle spectrometer.

5. A radon real time monitor and control system based upon alpha particle detection of radon and its daughter progeny atoms within an enclosed building environment, comprising:

a filter collector of particles within said enclosed building environment containing said radon and its daughter progeny atoms;

an electrical detector for producing electrical signals related to the number of alpha particles emitted by said radon and daughter progeny atoms in selected energy ranges for each of said daughter progeny atoms;

means for acquiring and processing said electrical signals to convert said number of alpha particles in said selected energy ranges to the number of progeny daughter atoms of elements selected from the group consisting of $^{222}$Rn, $^{218}$Po, and $^{214}$Po; and means for venting atmosphere from said enclosed building environment until the level of radon and its progeny daughter atoms detected by said electric detector is reduced to a desired level whenever a predetermined number of alpha particles from said selected progeny daughters is exceeded to thereby reduce health hazards to persons within said building environment.

6. A monitor of the efficacy of a dust filter in a conventional HVAC system used with an enclosed building environment, said HVAC containing a circulating fan, comprising:

a collector of dust from within said building environment, said dust containing radon daughter atoms including $^{214}$Po atoms;

an electrical alpha particle detector for producing electrical signals related to the number of alpha particles emitted by said $^{214}$Po atoms within said dust on said collector;

means for acquiring said electrical signals from said alpha particle detector and signals from said HVAC fan to determine the ability of said collector for collecting dust; and means for communicating to an attendant of said HAC system said efficacy of said dust filter based upon said signals from said electrical alpha particle detector and said signals from said HAC fan.

7. A monitor of the efficacy of removal of alpha particle emitters from a gas stream containing a trace of radon in an atmosphere of other gases, comprising:

a collector of dust and other materials containing atoms that emit alpha particles due to decay of said radon mounted proximate an enclosure containing said gas stream;

a detector of alpha particles proximate said collector for determining the number of alpha particles emitted by daughter progeny atoms of radon on said collector in specified energy ranges for each of said daughter progeny atoms;

means for forcing said gas stream containing said radon and other gases through said collector;

data processing means connected to said alpha particle detector for determining a ratio of $^{218}$Po/$^{222}$Rn daughter progeny atoms as a function of time; and means for communicating to an operator said efficacy of said collector based upon said ratio.

8. A real time system for the detection and mitigation of health hazards associated with radon and its progeny atoms in a generally enclosed building environment, comprising:

a collector within said building environment of alpha particle producing atoms associated with the radioactive decay of radon within said building environment;

an electrical alpha particle spectrometer proximate said collector, said spectrometer capable of resolving energy of alpha particles produced in the decay of $^{222}$Rn, $^{218}$Po, and $^{214}$Po;

a data acquisition system electrically connected to said spectrometer to record separately the number of $^{222}$Rn, $^{218}$Po and $^{214}$Po decays registered by said spectrometer;

first logic means operating on said recorded data of said acquisition system for determining levels of radon and its daughter atoms, and further logic means for control of venting means associated with said building environment for mitigation of said health hazards based upon an output of said first logic means.

9. The system of claim 8 wherein said collector is a filter for collecting solid products within said building environment, and wherein said further logic means operates said venting means for health hazard mitigation based on said recorded data for one of said $^{222}$Rn, $^{218}$PO and $^{214}$Po as determined by said first logic means.

10. A system for the real time detection an mitigation of health hazards associated with the concentration of radon and its progeny daughter atoms in a generally enclosed building environment, comprising:

a filter within said building environment for the collection of said progeny daughter atoms associated with radioactive decay of said radon within said building environment, said progeny daughter atoms producing alpha particles;

an electrical alpha particle spectrometer proximate said filter, said alpha particle spectrometer capable of resolving energy of, and producing electrical signals related to, alpha particles produced in the decay of $^{222}$Rn, $^{218}$Po, and $^{214}$Po;

a computer electrically connected to said alpha particle spectrometer to record separately the number of $^{222}$Rn, $^{218}$Po, and $^{214}$Po decays registered by said alpha particle spectrometer;

a first logic means operating on said recorded number of decays registered by said alpha particle spectrometer, as determined by said computer, for determining levels of said radon and said progeny daughter atoms; and further logic means connected to said first logic means for control of means for reducing said radon concentration within said building environment for said mitigation of said health hazards when said levels of said radon and said progeny daughter atoms exceed a preselected level.

11. The system of claim 10 wherein said electrical alpha particle spectrometer is a solid state spectrometer, and wherein said means for reducing said radon concentration is a venting means component of a HVAC system of said building environment.

* * * * *